United States Patent [19]

Newell et al.

[11] 4,293,441
[45] * Oct. 6, 1981

[54] CORROSION INHIBITING HEAT TRANSFER LIQUID

[75] Inventors: Richard G. Newell, Woodbury; Dale C. Perry, Welch, both of Minn.

[73] Assignee: Minnesota Mining and Manufacturing Company, St. Paul, Minn.

[ * ] Notice: The portion of the term of this patent subsequent to May 13, 1997, has been disclaimed.

[21] Appl. No.: 29,703

[22] Filed: Apr. 11, 1979

Related U.S. Application Data

[63] Continuation-in-part of Ser. No. 19,732, Mar. 12, 1979, Pat. No. 4,202,706.

[51] Int. Cl.$^3$ .............................................. C09K 3/00
[52] U.S. Cl. ............................. 252/389 A; 252/390; 252/391; 252/78.5; 106/14.12; 106/14.15; 148/6.17; 148/6.27; 148/31.5; 148/6.15 R; 260/944; 260/920; 260/945; 260/501.21; 260/502.5; 204/35 N

[58] Field of Search .................. 252/389 A, 390, 391, 252/80, 68, 71, 355, 78.5; 148/6.17, 6.27, 31.5, 6.15 R; 106/14.12, 14.15; 204/35 N; 260/944, 945, 924, 501.21, 502.5, 920

[56] References Cited

U.S. PATENT DOCUMENTS

| | | | |
|---|---|---|---|
| 3,012,917 | 12/1961 | Riou et al. | 148/6.27 |
| 3,094,547 | 6/1963 | Heine | 260/944 |
| 3,468,725 | 9/1969 | Uhlig | 148/6.15 R |
| 3,630,790 | 12/1971 | Schmidt et al. | 148/6.15 R |
| 3,767,439 | 10/1973 | Moyer et al. | 260/944 |
| 3,911,056 | 10/1975 | Houghton | 260/944 |
| 3,912,654 | 10/1975 | Heid et al. | 252/321 |
| 3,948,819 | 4/1976 | Wilde | 252/545 |
| 3,970,586 | 7/1976 | Schliebs et al. | 260/944 |

*Primary Examiner*—J. L. Barr
*Attorney, Agent, or Firm*—Cruzan Alexander; Donald M. Sell; William G. Ewert

[57] ABSTRACT

A liquid composition useful for minimizing corrosion of aluminum surfaces comprising ethylene glycol or propylene glycol and fluoroaliphaticsulfonamidophosphonic acid or the salt thereof.

6 Claims, No Drawings

CORROSION INHIBITING HEAT TRANSFER LIQUID

This is a continuation-in-part of our application Ser. No. 19,732, filed Mar. 12, 1979, now U.S. Pat. No. 4,202,706.

This invention relates to the treatment of aluminum surfaces with fluoroaliphatic radical-containing phosphonic acids and the salts thereof. In another aspect, it relates to the treatment of bare aluminum surfaces with fluoroaliphaticsulfonamidophosphonic acids, or the salts thereof. In a further aspect, it relates to corrosion inhibiting heat transfer liquids, such as aqueous ethylene glycol used as coolant in the cooling system of an internal combustion engine.

There are in the prior art several classes of fluoroaliphatic radical-containing phosphorous acids and the salt and ester derivatives thereof. For example, fluoroalkanephosphonic acids are described in U.S. Pat. Nos. 2,559,754 (Bittles et al), 3,012,917 (Riou et al), 3,630,790 (Schmidt et al), and 3,912,654 (Held et al) and 3,639,144 (Chance et al). Various fluoroaliphatic radical-containing phosphoric acids and phosphates are also known, including certain fluoroaliphatic radical-containing N-alkylsulfonamidoalkanephosphoric acids which are described in U.S. Pat. Nos. 3,094,547 (Heine), 3,911,056 (Houghton) and 3,948,819 (Wilde), and British Patent Specification No. 1,380,561 (Deem). And U.S. Pat. No. 3,970,586 (Schiebs et al) discloses certain perfluoroalkanesulfonamidoalkanephosphonic and phosphinic acids and their salts. Some of these patents, e.g. U.S. Pat. Nos. 3,012,917, 3,630,790, and 3,911,056, disclose the use of their fluoroaliphatic phosphorus acids or derivatives thereof in the treatment of metal surfaces.

U.S. Pat. No. 3,341,469 (Pines et al) discloses adding certain organosiloxane-silicate corrosion inhibitors to alcohols, such as ethylene glycol, used as anti-freezes and coolants for the cooling systems of internal combustion engines.

In accordance with this invention, there is provided a corrosion inhibiting liquid composition, useful as or in a heat transfer medium for a heat exchanger, such as the cooling system of an internal combustion engine, comprising (1) ethylene glycol, propylene glycol or mixtures thereof, including aqueous solutions thereof, and (2) as a corrosion inhibitor, fluoroaliphatic radical-containing phosphonic acid or salt or hydrolyzable ester thereof, which imparts corrosion resistance to aluminum articles in contact with said composition, particularly aluminum metal defining at least in part the flow passageways of said heat exchanger.

The fluoroaliphatic radical-containing phosphonic acids, salts and esters used as corrosion inhibitors in this invention are preferably those of the general formula:

$$R_f-Q-\overset{O}{\underset{OM^2}{\overset{\|}{P}}}-OM^1 \qquad I$$

in which
$R_f$ is a fluoroaliphatic radical,
Q is a divalent linkage through which $R_f$ and the phosphorus atom, P, are covalently bonded together, the skeletal chain of such linkage being free of moieties, such as ester groups, which are more readily hydrolyzable than amido moieties; and $M^1$ and $M^2$ are preferably hydrogen but can be independently alkyl (e.g., with 1 to 8 carbon atoms) or any salt-forming cation, preferably a Group I or Group II metal cation (e.g., the cations of Li, Na, K and Ca), ammonium, or an aliphatic primary, secondary, tertiary, or quaternary ammonium cation, e.g., $RNH_3^+$, $R_2NH_2^+$, $R_3NH^+$ and $R_4N^+$, where R is alkyl or alkaryl or substituted alkyl or alkaryl (such as hydroxyalkyl) with 1 to 18 carbom atoms.

In said Formula I, $R_f$ is a monovalent fluorinated aliphatic radical containing at least one carbon atom and preferably a terminal —$CF_3$ group. Where $R_f$ contains a plurality of carbon atoms in a skeletal chain, such chain may be branched or cyclic but preferably is a straight chain. Said skeletal chain of carbon atoms can be interrupted by divalent oxygen or trivalent nitrogen hetero atoms, each of which is bonded only to carbon atoms, but preferably where such hetero atoms are present, such skeletal chain does not contain more than one said hetero atom for every two carbon atoms. An occasional carbon-bonded hydrogen atom, bromine atom, or chlorine atom may be present; where present, however, they preferably are present not more than once for every two carbon atoms in the chain. Thus, the non-skeletal valence bonds are preferably carbon-to-fluorine bonds, that is, $R_f$ is preferably perfluorinated. The total number of carbon atoms of $R_f$ can vary and be, for example, 1 to 18, preferably 1 to 12. Where $R_f$ is or contains a cyclic structure, such structure preferably has 5 or 6 ring member atoms, 1 to 2 of which can be said hetero atoms, i.e., oxygen and/or nitrogen. $R_f$ is preferably free of ethylenic or other carbon-to-carbon unsaturation, that is, it is a saturated aliphatic, alicyclic, or heterocyclic radical. Generally, $R_f$ will contain 40 to 78 weight percent, preferably 50 to 77 weight percent, carbon-bonded fluorine. Examples of $R_f$ radicals are fluorinated alkyl, e.g., $C_4F_{10}$—, and alkoxyalkyl, e.g., $CF_3OCF_2$—, said radicals being preferably perfluorinated straight-chain alkyl radicals, $C_nF_{2n+1}$, where n is 1 to 12.

The function of the linkage Q is to covalently bond the fluoroaliphatic radical, $R_f$, and the phosphorus atom together in the same molecule. Q can be a valence bond, for example, where a carbon atom of a fluoroaliphatic radical is bonded or linked directly to the phosphorus atom. Q can also comprise one or more linking groups such as polyvalent aliphatic, e.g,

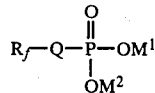

—$CH_2CH_2$—, and —$CH_2CH(CH_2$—$)_2$, polyvalent aromatic, e.g.,

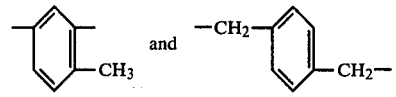

oxy, thio, carbonyl, sulfone, amine, e.g., —NH— and —$N(C_2H_5)$—, and combinations thereof which are not more readily hydrolyzable than the amido moiety, —CONH— or —$SO_2NH$—, such as oxyalkylene, iminoalkylene, iminoarylene, sulfonamido, carbonamido, sulfonamidoalkylene, and carbonamidoalkylene. The linkage Q for a specific compound will be dictated by the ease of preparation of such compound and the availability of necessary precursors thereof.

From the above description of Q it is apparent that this linkage can have a wide variety of structures, and in fact where it is a valence bond, it doesn't even exist as a structure. In general the total Q content of the compound is preferably less than 50 weight percent of the compound.

A preferred subclass of the compounds of Formula I are the fluoroaliphaticsulfonamidophosphonic acids, and salts thereof, of the formula

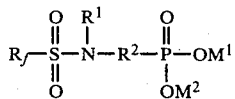
II in which $R_f$ is a monovalent fluorinated aliphatic radical as defined for Formula I, $R^1$ is a lower alkyl group having 1 to 8, preferably 1 to 6, carbon atoms, $R^2$ is alkylene, $(CH_2)_a$, wherein a is 1 to 16, preferably 3 to 11, or $R^2$ is an alkanetriyl group bonded to $R^1$ and the sulfonamido nitrogen atom to form an azacylic group which has 4 or 5 ring carbon atoms and 0 to 6 exocyclic carbon atoms, and $M^1$ and $M^2$ are as defined for Formula I.

Representative compounds of Formula I are:
N-Methyltrifluoromethanesulfonamidomethanephosphonic acid;
2-(N-Methyltrifluoromethanesulfonamido)ethanephosphonic acid;
3-(N-Ethylperfluoroethanesulfonamido)propanephosphonic acid;
3-(N-Methylperfluorohexanesulfonamido)propanephosphonic acid;
3-(N-Ethylperfluorododecanesulfonamido)propanephosphonic acid;
3-(N-Ethylperfluorooctadecanesulfonamido)propanephosphonic acid;
11-(N-Ethylperfluorooctanesulfonamido)undecanephosphonic acid;
6-(N-Methylperfluorobutanesulfonamido)hexanephosphonic acid;
3-(N-Ethyl-4-hydroperfluorobutanesulfonamido)-propanephosphonic acid;
3-(N-Methyl-1,1-dihydroperfluorobutanesulfonamido)-propanephosphonic acid;
3-(N-Methylperfluorocyclohexanesulfonamido)-propanephosphonic acid;
3-(N-Methyl-1,2-dihydroperfluorobutanesulfonamido)-propanephosphonic acid;
3-(N-Methylperfluoroisopropanesulfonamido)propanephosphonic acid;
(N-Perfluorooctanesulfonyl-4-methyl)pyrroliden-3-ylmethanephosphonic acid;
N-Perfluorobutanesulfonylpiperazin-1-ylmethanephosphonic acid;
3-(N-ethylperfluoromethanesulfonamido)propanephosphonic acid;
4-(N-methylperfluorooctanesulfonamido)butanephosphonic acid;
3-(N-ethylperfluorooctanesulfonamido)propanephosphonic acid;
3-(N-ethylperfluorobutanesulfonamido)propanephosphonic acid;
1,1,2,2-tetrahydroperfluorooctanephosphonic acid;
3-perfluorooctanesulfonamidopropanephosphonic acid;
and the salts and readily hydrolyzable alkyl esters of the above listed acids.

Compounds of Formula II wherein $R^2$ is alkylene with 2 to 16 carbon atoms and $M^1$ and $M^2$ are hydrogen can be prepared by hydrolyzing the esters (III) in turn prepared by free radical-catalyzed addition of a dialkyl phosphite to N-alkenyl-fluoroalkanesulfonamides (IV, where n is 0 to 14) in accordance with the equation:

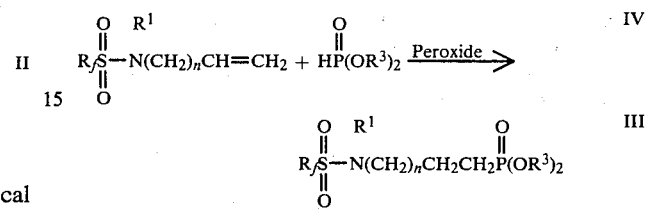

wherein $R_f$ and $R^1$ are as defined for Formula II, and $R^3$ is alkyl, aryl, or combinations thereof having 1 to 10 carbon atoms. The reaction can be carried out (cf. U.S. Pat. No. 4,067,820) by heating the sulfonamide (IV) with an excesss of dialkyl phosphite at 100° to 200° C. for several hours while adding portion-wise over the heating period about 1 to 5 percent of a peroxide, such as di-t-butyl peroxide. A preferred method of performing the reaction is to concurrently add a solution of the sulfonamide in dialkyl phosphite and a solution of the peroxide in dialkyl phosphite to the dialkyl phosphite heated to 100° to 200° C. The product (III) is then isolated by distillation at reduced pressure. The sulfonamides (IV) are prepared by procedures known in the art, (cf. U.S. Pat. No. 2,803,656).

Compounds of Formula II wherein $R^2$ is methylene can be prepared by hydrolyzing the esters (V) prepared by the reaction of fluoroaliphatic sulfonamides (VI), such as disclosed in U.S. Pat. No. 2,803,656, with formaldehyde followed by reaction with trialkyl phosphite in accordance with the equations:

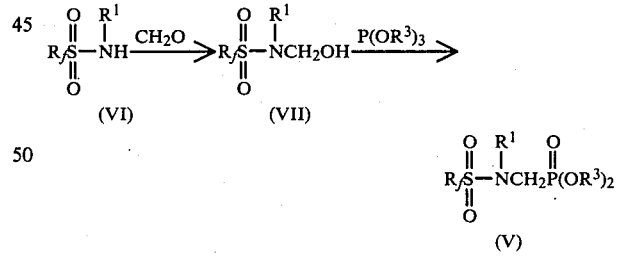

wherein $R_f$, $R^1$ and $R^3$ are the same as defined above.

A preferred procedure for hydrolysis of the ester precursors of the acids of Formula II involves converting precursor alkanephosphonate esters (IX) to trimethylsilyl phosphonates by the method described by McKenna et al, *Tetrahedron Letters,* 1977, 155 and then adding water, in accordance with the equations:

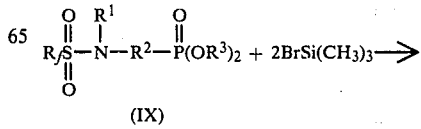
(IX)

-continued

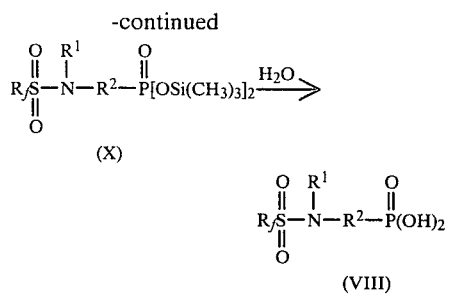

(X)

$$R_fS(O)_2-N(R^1)-R^2-P(OH)_2$$

(VIII)

wherein $R_f$, $R^1$, $R^2$ and $R^3$ are as defined above. The conditions of the reactions are mild. Generally, the first reaction is brought about by heating the alkanephosphonate (IX) with excess bromotrimethylsilane at 20° to 50° C. for 1 to 100 hours. The second reaction is brought about by stirring the product (X) of the first reaction with excess water at 20° to 50° C. for less than about 6 hours, generally less than 1 hour. The phosphonic acids (VIII) are generally isolated from the reaction mixture by filtration or extraction with diethylether, washed, then dried under reduced pressure.

Compounds of Formula I wherein $M^1$ and $M^2$ are salt-forming cations can be prepared by neutralization of the corresponding phosphonic acids by known procedures, i.e., by reaction with 1 or 2 molar equivalents of base, such as the hydroxide, carbonate and acetate of suitable cations. The salts of the phosphonic acids can also be prepared by direct saponification of the corresponding alkyl esters by known procedures. Under normal conditions of use, if the phosphonic compounds are added as esters to the glycol solutions, they will be hydrolyzed to the acids or salts.

Other compounds of Formula I and their preparation are known in art and a description of their preparation will be omitted in the interest of brevity.

The term "aluminum" unless otherwise qualified herein, refers to non-alloyed aluminum or to alloys consisting predominately of aluminum, such as those alloys described in "Aluminum Standards and Data," Fifth Edition, January, 1976, The Aluminum Association, Inc. and listed in that text in Tables 1.1 and 1.3, viz, those of the 1000 to 7000 series. As is well known, aluminum surfaces exposed to the air inherently are aluminum oxide surfaces.

When heat exchangers are constructed of aluminum, the metal can be corroded by the circulating heat exchange medium in contact therewith. The solutions of this invention, used as the heat transfer liquid in such heat exchangers, minimizes the corrosion.

The concentration of the fluoroaliphatic phosphonic acids or salts in the liquid compositions of this invention will be that sufficient to inhibit the corrosion of the metal with which the liquid compositions come into contact. Such concentration is generally $5 \times 10^{-5}$ to 1 weight percent of the liquid composition.

The compositions of the heat transfer medium of this invention can vary, depending on its particular application and particularly the temperature extremes to which the medium is exposed. For use at elevated temperatures, for example, at temperatures above 100° C., little or no water need be added to the glycol/fluoroaliphaticphosphonic acid solution. The minimum freezing point of the medium is obtained with about equal parts of the glycol and water. For maximum efficiency of the transfer of heat, the medium can contain as much as 90% or more of water.

Various conventional auxilliary agents can be added to the glycol/fluoroaliphaticphosphonic acid medium to assist it in its function as a heat transfer liquid, such as surfactants, anti-foam agents, identifying dyes, pH buffers, conventional corrosion inhibitors, sealants, anticreep agents, and the like.

While the phosphonic acid salts are sufficiently soluble in aqueous solutions, the free acid has relatively low solubility. In concentrated solutions, and in solutions at a pH of less than 7, it will be generally desirable to include a non-ionic surfactant, particularly a fluoroaliphatic non-ionic surfactant, to stabilize the solution. Generally, about equal weights of surfactant and fluoroaliphatic phosphonic acid or salt can be used.

In the case of a heat exchanger such as an automobile radiator or solar heating unit, made of bare aluminum, the corrosion inhibited liquid heat transfer medium of this invention is introduced and circulated in the exchanger in the normal manner.

Objects and advantages of this invention are illustrated in the following examples. In these examples, the indicated structures of the products made were confirmed by nuclear magnetic resonance and infrared spectral analyses.

EXAMPLE 1

A mixture of N-butyltrifluoromethanesulfonamide (62.0 g, 0.302 mole), potassium carbonate (45.54 g, 0.330 mole) and methanol (250 ml) was refluxed with stirring for two hours. Allyl bromide (39.93 g, 0.330 mole) was then added and this mixture stirred under reflux for 24 hours, cooled, filtered, and the solvent evaporated in vacuo. The residue was fractionally distilled yielding 37.0 g (b.p. of 53°–58° C. at 0.07 torr) of the desired compound, N-allyl-N-butyltrifluoromethanesulfonamide.

Over a 60 minute period, a solution of the above-prepared N-allylsulfonamide (24.60 g, 0.10 mole) and diethylphosphite (15 g) was added dropwise concurrently with a solution of di-t-butyl peroxide (0.90 g) in diethylphosphite (5 g) to diethylphosphite (80 g) being stirred at 150° C. with an argon purge. The resulting mixture was stirred for an additional 1 hour under these conditions. The excess diethylphosphite was distilled at 10–20 torr and the residue fractionally distilled to give 19.64 g (b.p. 150°–153° C. at 0.20 torr) of the desired compound, diethyl 3-(N-butyltrifluoromethanesulfonamido)-propanephosphonate. A mixture of the phosphonate prepared above (15.36 g, 0.040 mole) and bromotrimethylsilane (13.46 g. 0.088 mole) was stirred under a reflux condensor and calcium chloride drying tube for 96 hours. Then water (75 ml) was added and the resulting mixture stirred for 15 minutes followed by extraction with three 50 ml portions of diethylether. The ether portions were combined, dried with MgSO4 and evaporated in vacuo to give 12.25 g of the desired compound, 3-(N-butyltrifluoromethanesulfonamido)propanephosphonic acid.

EXAMPLE 2

The procedure of Example 1 was repeated with the exception that N-ethylperfluorobutanesulfonamide was used in place of N-butyltrifluoromethanesulfonamide to make N-allyl-N-ethylperfluorobutanesulfonamide (b.p. 50°–55° C. at 0.12 to 0.10 torr). The latter was reacted with diethylphosphite to produce the desired compound, diethyl 3-(N-ethylperfluorobutanesulfonamido)propanephosphonate (b.p. 148°–152° C. at 0.4–0.5 torr). A solution of the phosphonate prepared in Example 3 (30.0 g, 0.062 mole) and bromotrimethylsilane (20.0 g, 0.130 mole) was stirred under a reflux condenser and calcium chloride drying tube for 24 hours, water (75 ml) was added, and the mixture stirred for 15 minutes. The resulting white precipitate was filtered and washed with water (50 ml) and diethylether (100 ml), then dried in an oven at 100° C. for 24 hours at 10–20 torr, to yield the desired compound, 3-(N-ethylperfluorobutanesulfonamido)propanephosphonic acid (m.p. 138.5°–140° C.).

EXAMPLE 3

Following the procedure of Example 1, starting with N-ethylperfluorooctanesulfonamide, diethyl 3-(N-ethylperfluorooctanesulfonamido)propanephosphonate (b.p. 170°–173° C. at 0.05 torr) was made. The latter was hydrolyzed according to the procedures of Example 2 to produce the corresponding phosphonic acid (m.p. 146°–151° C.).

EXAMPLE 4

Following the bromination procedure described by L. H. Smith, *Org. Synthesis*, Coll. Vol. 3, p. 193, a solution of chloroform (20 ml) and phosphorus tribromide (31.67 g, 0.119 mole) was cooled to −10° C. with an ice-salt bath. Over a 15-minute period, dry pyridine (5.11 ml) was added to this solution while stirring the resulting mixture. A solution of 4-(N-methylperfluorooctyloctanesulfonamido)butanol (193.00 g, 0.330 mole), chloroform (200 ml) and dry pyridine (1.49 ml) was added dropwise over a 2-hour period. The reaction mixture was stirred for another 1.5 hours at 0° to −10° C., then at room temperature for 36 hours. The mixture was extracted with three 75 ml portions of cold (0° C.) concentrated sulfuric acid. Anhydrous potssium carbonate was added to the extracted solution, the mixture stirred overnight at room temperature and then filtered and evaporated in vacuo. The resulting solid residue was recrystallized from chloroform/petroleum ether (30°–75° C. b.p.) to give 109.80 g of 1-bromo-4-(N-methylperfluorooctanesulfonamido)butane.

Following the procedures of L. Maier et al, *Organic Phosphorus Compounds*, Vol. 7, John Wiley & Sons, New York, 1976, p. 23, a mixture of above-prepared bromide (32.40 g. 0.05 mole) and triethylphosphite was stirred at 150°–155° C. for 4 hours, after which the volatile materials present were removed by distillation at 100°–105° C. at 0.20 torr. The residue was stirred for 16 hours at room temperature under a calcium chloride drying tube with bromotrimethylsilane (16.83 g, 0.11 mole). To this mixture 75 ml of water was added, followed by stirring for 5 minutes. The resulting white precipitate was filtered, washed twice with 100 ml portions of water and three times with 100 ml portions of diethyl ether. After drying at 80° C. at 10–20 torr for 4 hours, 19.33 g of 4-(N-methylperfluorooctanesulfonamido)butanephosphonic acid (m.p. 150°–163° C.) was obtained.

EXAMPLE 5

Starting with 11-(N-ethylperfluorooctanesulfonamido)undecanol and utilizing the procedures described in Example 4, 11-(N-ethylperfluorooctanesulfonamido)undecanephosphonic acid (m.p. 77°–88° C.) was prepared.

EXAMPLE 6

Following the procedure described in Example 1, N,N-diallylperfluorooctanesulfonamide was reacted with diethylphosphite. As a result of an internal cyclization, the product obtained was diethyl 1-perfluorooctylsulfonyl-4-methylpyrroliden-3-ylmethanephosphonate (b.p. 165°–167° C. at 0.22 torr). The latter product was hydrolyzed according to the procedure of Example 2 to produce the corresponding acid (m.p. 150°).

EXAMPLE 7

Following the procedure of Example 1, N-allyl-N-ethyltrifluoromethanesulfonamide (b.p. 395° C. at 1.50–0.35 torr) was reacted with diethylphosphite to produce diethyl 3-(N-ethyltrifluoromethanesulfonamido)propanephosphonate (b.p. 147°–155° C. at 0.25 torr). Following the procedure of Example 2, this phosphonate was hydrolyzed to produce the corresponding phosphonic acid (m.p. 137.5°–139.5° C.).

EXAMPLE 8

Following the procedure of Example 1, N-allyl-N-butylperfluorooctanesulfonamide was converted to diethyl 3-(N-butylperfluorooctanesulfonamido)propanephosphonate (b.p. 185°–200° C. at 0.10 torr). This latter compound was converted to the corresponding phosphonic acid (m.p. 51°–58° C.) by the procedure described in Example 2.

EXAMPLE 9

The ability of the fluoroaliphaticphosphonic acids to impart corrosion resistance to aluminum was determined by measuring the corrosion current density, $j_{corr}$, in microamperes per square centimeter, a/cm$^2$, which is directly proportional to the corrosion rate. This means the larger the $j_{corr}$ value, the more corrosion that is taking place. The $j_{corr}$ was measured by a well-known electrochemical technique called linear polarization, as explained by F. Mansfeld in *Adv. Corr. Sci. Technol.*, 6, 163 (1976). This technique was applied to 1.25 cm × 1.25 cm cylinders of 2024 T aluminum treated with fluoroaliphatic phosphonic acid. The aluminum cylinders were solvent-wiped with acetone, then immersed in a solution of 0.1% fluoroaliphaticphosphonic acid in doubly distilled deionized water solution at 90°–100° C. for 10 minutes, followed by a water rinse. These treated cylinders were used as the electrodes to determine the $j_{corr}$. The $j_{corr}$ was measured at pH 3 and pH 10 in 5% NaCl solution at 25° C. The results are shown in Tables 1 and 2. The low $j_{corr}$ values obtained for the fluoroaliphaticphosphonic acid treated aluminum shows the corrosion inhibiting effect of these materials.

TABLE 1

| Run | Fluoroaliphaticphosphonic acid | $j_{corr}$, $\mu a/cm^2$, at pH3 |
|---|---|---|
| 1 | None | 3.45 |
| 2 | $C_8F_{17}SO_2N(C_2H_5)(CH_2)_{11}P(O)(OH)_2$ | 0.37 |
| 3 | $CF_3SO_2N(C_2H_5)(CH_2)_3P(O)(OH)_2$ | 0.030 |
| 4 | $C_8F_{17}SO_2N(CH_3)(CH_2)_4P(O)(OH)_2$ | 0.013 |
| 5 | $C_8F_{17}SO_2N(C_2H_5)(CH_2)_3P(O)(OH)_2$ | 0.013 |
| 6 | $C_4F_9SO_2N(C_2H_5)(CH_2)_3P(O)(OH)_2$ | 0.011 |
| 7 | $C_8F_{17}CH_2CH_2P(O)(OH)_2$ | 0.0061 |
| 8 | $C_8F_{17}SO_2NH(CH_2)_3P(O)(OH)_2$ | 0.0061 |

TABLE 2

| Run | Fluoroaliphaticphosphonic acid | $j_{corr}$, $\mu a/cm^2$, at pH10 |
|---|---|---|
| 1 | None | 12.0 |
| 2 | $C_8F_{17}SO_2NH(CH_2)_3P(O)(OH)_2$ | 11.9 |
| 3 | $C_8F_{17}SO_2N(C_2H_5)(CH_2)_3P(O)(OH)_2$ | 10.6 |
| 4 | $CF_3SO_2N(C_2H_5)(CH_2)_3P(O)(OH)_2$ | 9.3 |
| 5 | $C_8F_{17}SO_2N(C_2H_5)(CH_2)_{11}P(O)(OH)_2$ | 7.9 |
| 6 | $C_4F_9SO_2N(C_2H_5)(CH_2)_3P(O)(OH)_2$ | 7.4 |
| 7 | $C_8F_{17}CH_2CH_2P(O)(OH)_2$ | 6.6 |
| 8 | $C_8F_{17}SO_2N(CH_3)(CH_2)_4P(O)(OH)_2$ | 2.8 |

EXAMPLE 10

A freshly cleaned bare aluminum panel (Al 7072, typical of that used in the fabrication of aluminum radiators for automobiles) was immersed at 25° C. in a bath of 50 vol.% aqueous ethylene glycol solution containing 0.1 wt.% $C_8F_{17}SO_2N(C_2H_5)(CH_2)_3P(O)(OH)_2$ dissolved therein. The bath contained "corrosive" water, viz, one hundred times the chloride, sulfate, and bicarbonate concentration specified in ASTM D 1384. During the immersion, the $j_{corr}$ values were measured after 1 hour to get an initial value and after 1-2 days by the linear polarization method described in Example 9. The exposure was run under nitrogen at 25° C. For purposes of comparison, $j_{corr}$ was obtained under the same conditions for an uninhibited solution of the ethylene glycol and for a solution of a commercially available inhibited ethylene glycol anti-freeze. Results are set forth in the table below:

| Run | Liquid Composition | $j_{corr}$, $\mu a/cm^2$ Initial | 1-2 days |
|---|---|---|---|
| 1 | Aqueous ethylene glycol containing no inhibitor | 3.6 | 2.6 |
| 2 | Aqueous ethylene glycol solution of $C_8F_{17}SO_2N(C_2H_5)(CH_2)_3P(O)(OH)_2$ | 0.32 | 0.12 |
| 3 | Aqueous solution of commercially available corrosion inhibited ethylene glycol anti-freeze | 0.22 | 0.45 |

EXAMPLE 11

The durability of a fluoroaliphatic phosphonic acid treatment as compared to a hydrocarbonphosphonic acid treatment was measured by utilizing the linear polarization technique and treatment procedures described in Example 9. The aluminum samples were immersed in either a pH 3 or pH 10, 5% NaCl solution at room temperature over a period of several days. At daily intervals the $j_{corr}$ was measured. As can be seen from Tables 3 and 4, the fluoroaliphaticphosphonic acid treatment is significantly more stable than the hydrocarbonphosphonic acid.

TABLE 3

| Run | Phosphonic acid | $j_{corr}$, $\mu a/cm^2$, at pH 3 Initial | 1 day | 2 days | 3 days | 4 days |
|---|---|---|---|---|---|---|
| 1 | None | 3.4 | 31 | — | — | — |
| 2 | $C_8F_{17}SO_2N(C_2H_5)(CH_2)_3P(O)(OH)_2$ | 0.12 | 2.4 | 2.9 | 4.8 | 8.5 |
| 3 | $C_{18}H_{37}P(O)(OH)_2$ | 0.015 | 5.9 | 9.9 | 17 | — |

TABLE 4

| Run | Phosphonic acid | $j_{corr}$, $\mu a/cm^2$, at pH 10 Initial | 1 day | 2 days |
|---|---|---|---|---|
| 1 | none | 8.6 | 17 | 17 |
| 2 | $C_8F_{17}SO_2N(C_2H_5)(CH_2)_3P(O)(OH)_2$ | 6.9 | 5.8 | 6.7 |
| 3 | $C_{18}H_{37}P(O)(OH)_2$ | 5.8 | 5.9 | 13 |

EXAMPLE 12

A number of aqueous ethylene glycol/fluoroaliphaticphosphonic acid liquid compositions of this invention were evaluated in accordance with Section 41 of BS 5117, December, 1974, of the British Standards Institution. The compositions consisted of equal parts of ethylene glycol and corrosive water (viz., water containing 100 ppm each of chloride, sulfate, and bicarbonate ions). The corrosion inhibiting fluorochemical used was $C_8F_{17}SO_2N(C_2H_5)(CH_2)_3P(O)(OH)_2$, which was added to the aqueous ethylene glycol along with a fluorochemical surfactant, $C_8F_{17}SO_2N(C_2H_5)(CH_2CH_2O)_{12}H$, as stabilizer. The aluminum sample panels used weighed 1.2 to 1.3 g and were of Al 6063. After 14 days of immersion of the aluminum panels at 105° C. in the liquid compositions, the panels were withdrawn from the compositions, rinsed, dried, weighed and visually examined. For purposes of comparison, like aluminum panels were similarly immersed in 50 wt.% aqueous ethylene glycol containing no additives and in a 50 wt.% aqueous solution of a commercially available corrosion inhibited ethylene glycol anti-freeze. Results are summarized in the following table:

TABLE

| Run | Liquid Composition | Appearance | Weight loss of aluminum panel, mg. |
|---|---|---|---|
| 1 | Aqueous ethylene glycol containing no inhibitor | 2 deep pits | 1.2 |
| 2 | Commercially available, corrosion-inhibited aqueous ethylene glycol anti-freeze | more than 50 shallow pits | 1.2 |
| 3. | Aqueous ethylene glycol containing 1 ppm each of fluoroaliphatic phosphonic acid and surfactant | pit free | 0 |
| 4. | Aqueous ethylene glycol containing 10 ppm each of fluoroaliphatic phosphonic acid and surfactant | 2 shallow pits | 0.4 |
| 5. | Aqueous ethylene glycol containing 1000 ppm each of fluoroaliphatic phosphonic acid and surfactant | 1 shallow pit | 0.1 |

The above data show that superior corrosion resistance is obtained with the liquid compositions of this invention (Runs 3–5).

Various modifications and alterations of this invention will become obvious to those skilled in the art without departing from the scope of this invention.

What is claimed is:

1. A liquid composition comprising ethylene glycol or propylene glycol and an amount, sufficient to inhibit corrosion of a metal in contact with said composition, of fluoroaliphaticsulfonamidophosphonic acid or the salt thereof.

2. A liquid composition comprising ethylene glycol or propylene glycol and an amount, sufficient to inhibit corrosion of a metal in contact with said composition, of fluoroaliphatic compound of the formula:

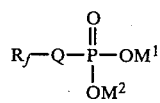

in which $R_f$ is a fluoroaliphatic radical, Q is a linkage through which $R_f$ and the phosphorus atom, P, are covalently bonded together, the skeletal chain of such linkage being free of moieties which are more readily hydrolyzable than an amido moiety, and $M^1$ and $M^2$ are indepdendently hydrogen or salt-forming cations.

3. A liquid composition comprising an aqueous solution of ethylene glycol and an amount, sufficient to inhibit corrosion of a metal in contact with said composition, of fluoroaliphatic compound having the general formula:

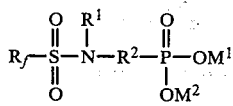

in which $R_f$ is a monovalent fluoroaliphatic radical, $R^1$ is hydrogen or an alkyl group having 1 to 8 carbon atoms, $R^2$ is an alkylene group with 1 to 16 carbon atoms or $R^1$ together with $R^2$ and the sulfonamido nitrogen form an azacyclic ring, and $M^1$ and $M^2$ are independently hydrogen or salt-forming cations.

4. A liquid composition comprising an aqueous solution of ethylene glycol and fluoroaliphatic compound in the amount of $5 \times 10^{-5}$ to 1 weight percent, said compound having the general formula:

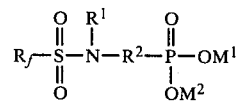

in which $R_f$ is a monovalent fluoroaliphatic radical having 1 to 18 carbon atoms and a terminal —$CF_3$ group, $R^1$ is an alkyl group having 1 to 6 carbon atoms, $R^2$ is an alkylene group with 3 to 11 carbon atoms, or $R^2$ is an alkanetriyl group bonded to $R^1$ and the sulfonamido nitrogen atom to form an azacylic group which has 4 or 5 ring carbon atoms and 0 to 6 exocyclic carbon atoms, and $M^1$ and $M^2$ are independently hydrogen or salt-forming cations selected from the group consisting of Group I or Group II metal cations, ammonium, or an aliphatic primary, secondary, tertiary, or quaternary ammonium cation.

5. The composition according to claim 4 wherein said fluoroaliphatic compound is selected from the group consisting of
   3-(N-butyltrifluoromethanesulfonamido)propanephosphonic acid,
   3-(N-ethyltrifluoromethanesulfonamido)propanephosphonic acid,
   3-(N-ethylperfluorobutanesulfonamido)propanephosphonic acid,
   4-(N-methylperfluorooctanesulfonamido)butanephosphonic acid,
   3-(N-butylperfluorooctanesulfonamido)propanephosphonic acid,
   (N-perfluorooctanesulfonyl-4-methyl)pyrroliden-3-ylmethanephosphonic acid,
   11-(N-ethylperfluorooctanesulfonamido)undecanephosphonic acid and the salts thereof.

6. The composition according to claim 4 wherein said fluoroaliphatic compound is
   $C_8F_{17}SO_2N(C_2H_5)(CH_2)_3P(O)(OH)_2$.

* * * * *

UNITED STATES PATENT AND TRADEMARK OFFICE
CERTIFICATE OF CORRECTION

PATENT NO. : 4,293,441

DATED : October 6, 1981

INVENTOR(S) : RICHARD G. NEWELL AND DALE C. PERRY

It is certified that error appears in the above—identified patent and that said Letters Patent is hereby corrected as shown below:

Col. 4, l. 12: "
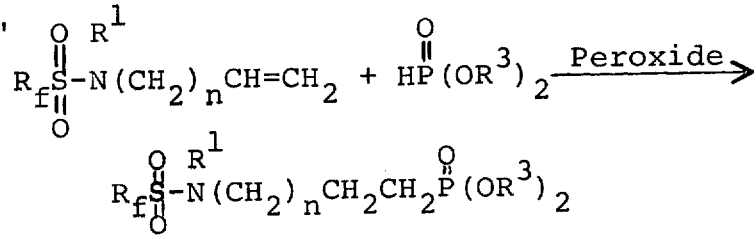
IV

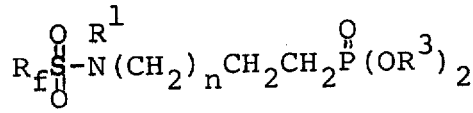
III"

should read

-- 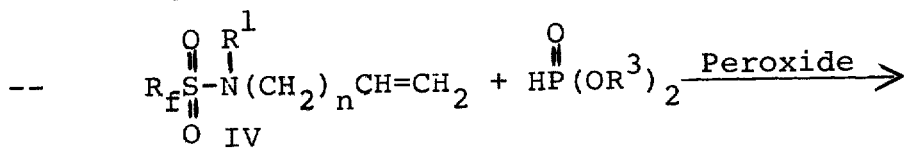
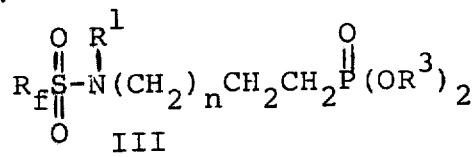
--.

Col. 11, l. 25: "indepdendently" should read -- independently --.

Signed and Sealed this

Eleventh Day of May 1982

[SEAL]

Attest:

GERALD J. MOSSINGHOFF

Attesting Officer    Commissioner of Patents and Trademarks